G. H. REYNOLDS, DEC'D.
A. E. REYNOLDS, ADMINISTRATRIX.
PIPE COUPLING.
APPLICATION FILED OCT. 8, 1906.
943,461.
Patented Dec. 14, 1909.
2 SHEETS—SHEET 1.
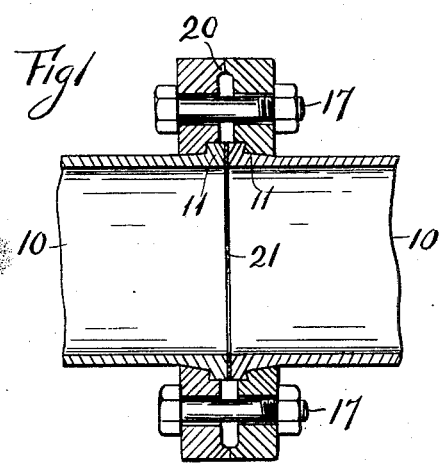
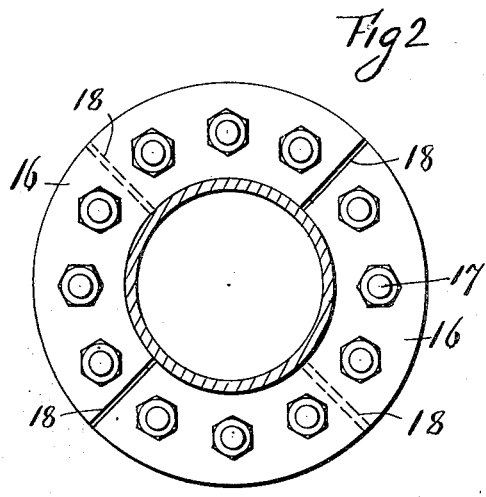
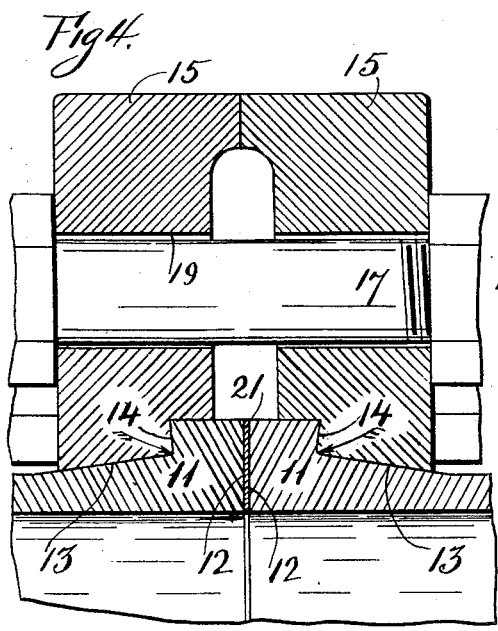
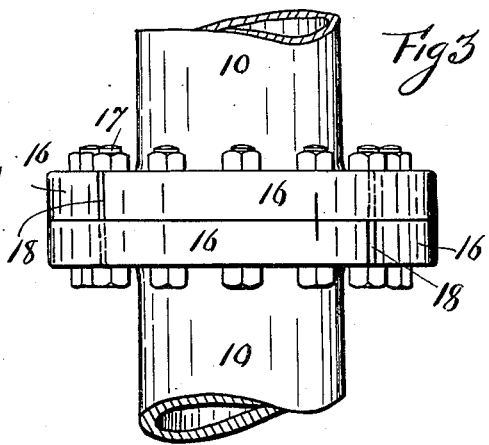

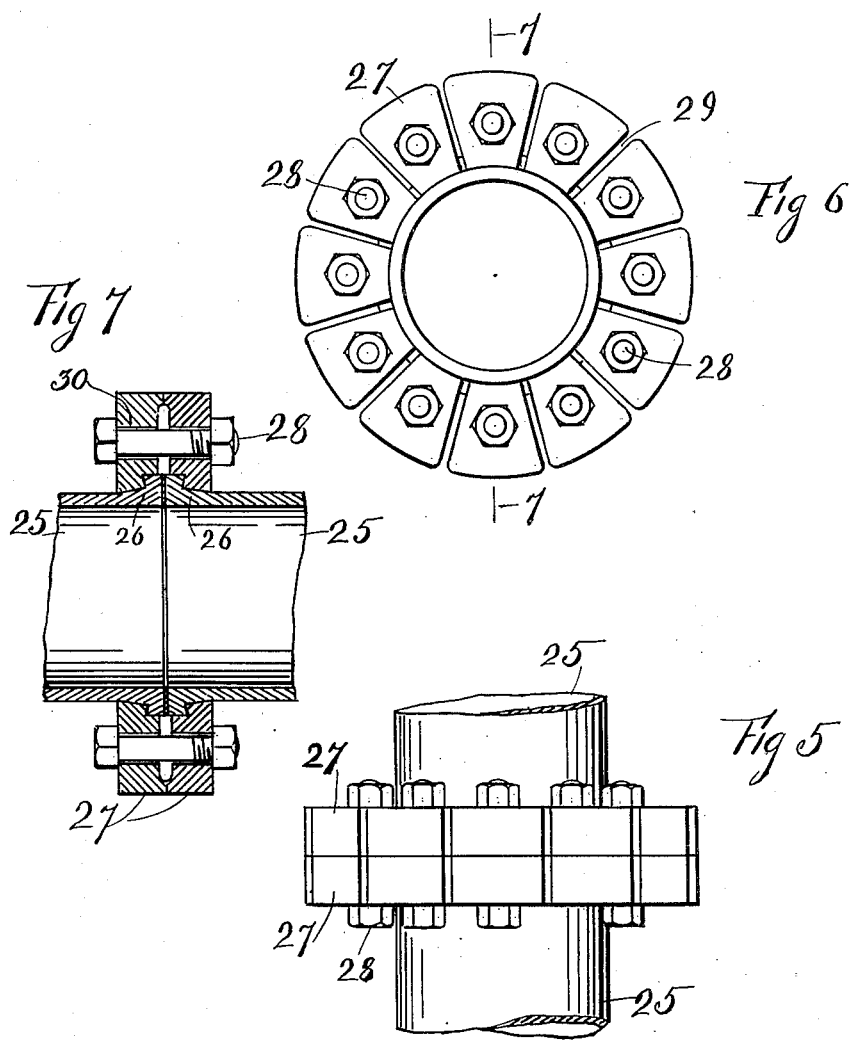

UNITED STATES PATENT OFFICE.

GEORGE H. REYNOLDS, OF MANSFIELD DEPOT, CONNECTICUT; ABBY E. REYNOLDS, ADMINISTRATRIX OF GEORGE H. REYNOLDS, DECEASED, ASSIGNOR TO GENERAL FIRE EXTINGUISHER COMPANY, A CORPORATION OF NEW YORK.

PIPE-COUPLING.

943,461.  Specification of Letters Patent.  Patented Dec. 14, 1909.

Application filed October 8, 1906. Serial No. 338,020.

*To all whom it may concern:*

Be it known that I, GEORGE H. REYNOLDS, a citizen of the United States, and a resident of Mansfield Depot, in the county of Tolland and State of Connecticut, have invented certain new and useful Improvements in Pipe-Couplings, of which the following is a specification.

This invention, which is an improvement of my pipe coupling described in U. S. Patent No. 787,791, dated April 18, 1905, relates to pipe couplings, and its object is the production of a coupling for flanged pipe sections, comprising essentially clamping devices which are dovetailed with the flanged ends of the pipe sections, when in operative position.

The organization of the invention is such that when the clamping devices are being placed in operative position with the flanged pipe sections, they will creep up on flared surfaces of said sections. Shoulders extend from the flared surfaces, and when corresponding shoulders of the clamping device engage the shoulders extending from the flared surfaces, binding forces are established which hold the flanged pipe sections in place and tend to crush them. Surfaces are formed on the clamping devices which abut with each other, while the other portions thereof are forcing the pipe sections together. The said abutting surfaces constitute a center of movements or fulcrum for the said forces, the directions of which are indicated by the arrows in Fig. 4. The members of the clamping devices are separated somewhat from each other, and the bolt holes therein are somewhat larger than the clamping bolts to allow the said creeping, and the subsequent engagement of the shoulders, of the clamping devices and flanged pipe sections. The latter action reduces the diameter of the outer contour of the clamping devices. My preferred form of clamping devices are sectional rings, and clamps as hereafter described can also be used.

In the drawings Figure 1 represents an axial section of the preferred form of coupling with a pair of pipe sections, Fig. 2 shows an end view of Fig. 1, Fig. 3 is a top plan view of Fig. 2 and Fig. 4 represents an enlarged portion of Fig. 1, Fig. 5 shows an elevation of a modification of the invention, Fig. 6 is a top plan view of Fig. 5, and Fig. 7 is a section of Fig. 6 on the line 7, 7.

A pair of pipe sections 10, have formed at their ends flanges 11, with their end faces 12 at right angles to the longitudinal axes of the said sections. The sides 13 of the flanges diverge or flare out from the outer cylindrical surfaces of the pipe sections, and then the contour of each flange takes a direction at right angles to the flared out portion forming a shoulder 14, after which the outer surface of the pipe flange is cylindrical and square with the said end face thereof.

The pipe flanges 11 are dovetailed with the sectional clamping rings 15, the latter having surfaces to conform to the accompanying surfaces of the flanges of the pipe sections.

Each clamping ring 15 consists of the sectional members 16, the members of one ring breaking joints with the members of the other ring, when they are clamped together with the bolts 17. Sufficient clearance 18 is provided between the members 16, and the holes 19 for the bolts are sufficiently large to allow the clamping rings to tightly clamp the pipe sections together. The abutting faces of the clamping rings have formed therewith the annular projections 20, which constitutes stops when they are hugging the flanged pipe ends 11, and perform the functions of a fulcrum or center of movements when the bolts 17 bring the clamping rings and flanges home. It will be noted by virtue of the said fulcrums and the dovetailed surfaces of contact between the clamping rings and the flanged ends of the pipe sections, that when the bolts 17 are screwed up, the direction of the forces established between the clamping rings and flanged pipe sections will be approximately in the directions of the arrows shown in Fig. 4, obtaining a practically tight joint with the packing 21 which is located between the ends of the pipe sections.

In the modification of the invention shown in Figs. 5 to 7, a pair of pipe sections 25, similar to 10 with flanges 26 similar to 11, are clamped together by means of clamps 27, which are dovetailed with the pipe sections as shown. The clamps 27 are held together and clamp the flanges in pairs, by means of the bolts 28. Sufficient clearance 29 is provided between the accompanying edges of the clamps, as well as between the holes 30 and bolts 28. The engaging surfaces of the clamps 27 with the pipe sections 25, are similar to the corresponding surfaces of the rings 15 and sections 10.

Having described my invention, I claim:

1. In a pipe coupling the combination with the flared flanged ends of pipe sections, of sectional clamping rings dovetailed with the said flanged ends, the members of one sectional ring breaking joints with the members of the other sectional ring, the members of each ring separated sufficiently to allow them to clamp the pipe sections tightly together, the said rings having flared surfaces and shoulders at right angles to said flared surfaces.

2. In a pipe coupling the combination with flared flanged ends of pipe sections, of sectional clamping rings dovetailed with the said flanged ends, the members of each sectional ring separated from each other and breaking joints with members of the other sectional ring, annular projections extending from the abutting accompanying faces of the rings and at the outer edges thereof, the rings having flared surfaces and shoulders at right angles to said flared surfaces, bolts joining the rings located between the said projections and bearing surfaces between the rings and said flanged ends, and packing between end faces of the pipe sections.

3. In combination with pipe-sections each provided with a smooth-faced end-flange formed at substantially a right-angle to its length, said pipe-sections being arranged in alinement with the faces of the flanges abutted and each having its periphery adjacent to said flange thickened or increased in diameter; a plurality of sectional clamping-members arranged in pairs around the pipe-sections and applied directly to the backs of said flanges, the engaging surfaces of the clamping members being grooved and formed to conform to said flanges and pipe-sections; and bolts passing through the clamping-members for forcing the same together and upon the opposed flanges so as to forcibly drive the abutting ends of the pipe-sections and faces of the flanges tightly together.

4. In combination with pipe-sections arranged with their ends abutted, said sections each having an angular flange which, when the pipe-sections are together, form a dovetail-flange; a plurality of clamping-members, applied directly to the backs of said flanges, having their engaging surfaces grooved to conform to said dove-tail flange; means applied directly to said clamping-members for forcing them together upon said dove-tail flange; and means compelling the clamping-members to apply their clamping force upon said dove-tail flange in a direction at an angle to its surfaces and to the length of the pipe-sections.

Signed at the borough of Manhattan in the county of New York and State of New York this 5th day of October A. D. 1906.

GEORGE H. REYNOLDS.

Witnesses:
MAY E. CAPLING,
H. L. CADMUS.